US008256451B2

(12) United States Patent
Frederiksen

(10) Patent No.: US 8,256,451 B2
(45) Date of Patent: Sep. 4, 2012

(54) VALVE DEVICE FOR FILLING CONTAINERS, IN PARTICULAR CONTAINERS INTENDED TO CONTAIN LIQUEFIED GASES

(75) Inventor: Niels Frederiksen, Herlev (DK)

(73) Assignee: Cavagna Group Switzerland S.A., Lugano (CH)

( * ) Notice: Subject to any disclaimer, the term of this patent is extended or adjusted under 35 U.S.C. 154(b) by 551 days.

(21) Appl. No.: 12/509,156

(22) Filed: Jul. 24, 2009

(65) Prior Publication Data
US 2010/0024918 A1  Feb. 4, 2010

(30) Foreign Application Priority Data

Jul. 31, 2008  (IT) .............................. PD2008A0235

(51) Int. Cl.
*F16K 31/18*  (2006.01)
(52) U.S. Cl. ......... 137/442; 137/445; 137/446; 141/198
(58) Field of Classification Search .................. 137/442, 137/446, 445, 434, 436, 439; 141/198, 192
See application file for complete search history.

(56) References Cited

U.S. PATENT DOCUMENTS

| 4,541,464 | A | | 9/1985 | Christiansen | |
|---|---|---|---|---|---|
| 5,472,012 | A | * | 12/1995 | Wood et al. | 137/416 |
| 5,850,849 | A | | 12/1998 | Wood | |
| 6,076,546 | A | * | 6/2000 | Waters | 137/390 |
| 6,293,302 | B1 | * | 9/2001 | Waters et al. | 137/390 |
| 6,536,465 | B2 | * | 3/2003 | David et al. | 137/442 |
| 6,910,499 | B2 | * | 6/2005 | Chan | 137/413 |
| 7,748,402 | B2 | * | 7/2010 | Chan | 137/422 |
| 2002/0148505 | A1 | | 10/2002 | David et al. | |
| 2005/0051214 | A1 | | 3/2005 | Chan | |

FOREIGN PATENT DOCUMENTS

WO   WO 99/47837   9/1999

* cited by examiner

*Primary Examiner* — Craig Schneider
(74) *Attorney, Agent, or Firm* — Fay Sharpe LLP

(57) ABSTRACT

A valve device for filling containers, particularly containers intended to contain liquefied gases, includes a valve body in which a gas duct is defined at the inlet of the container, the gas duct extending predominantly in an axial direction. A closure is axially movable in the valve body away from and towards a valve seat in order, respectively, to open and shut off the gas duct. A float type actuator, capable of exerting a thrust on a second end of the closure, is provided. A deflector cover is disposed transversely to the gas pipe and is integral with the valve body. The deflector includes a guide cavity in which a first end of the closure is slidably engaged.

14 Claims, 3 Drawing Sheets

VALVE DEVICE FOR FILLING CONTAINERS, IN PARTICULAR CONTAINERS INTENDED TO CONTAIN LIQUEFIED GASES

BACKGROUND

1. Technical Environment

The object of the present disclosure is a valve device for filling containers, in particular containers intended to contain liquefied gases.

2. Prior Art

Such containers, better known as "cylinders," are widely utilized where a connection to the distribution network for fuel gases has not been provided.

For financial and safety reasons it is best that the cylinders should be filled with a predefined maximum quantity of gas, avoiding overfilling and thus excessive internal pressure. For this reason the cylinders are equipped with devices for preventing overfilling, sized to cut off the flow of entering gas when a desired fill level has been reached.

Devices of the type described above are known, for example, to the production of the Applicant and comprise membrane valves. Such valves are of the type that is normally closed and comprise a perforated membrane in the center, which, becoming deformed under the action of the entering gas, permits its passage. The gas flow is intercepted when a prearranged level of filling is reached and a piston, placed below the membrane and actuated by a cam connected to a float inside the container, thrusts against a seat, closing one section for passage of the gas. The variation of the sections for passage causes a counter-pressure that acts on the membrane in a direction opposite to that of the gas entering the container, closing the entrance orifice.

The disadvantages of such solutions are those typical of the applications of valves to membranes, i.e., the greater predisposition to wear and tear and the consequent lesser reliability compared to solutions that use valves in which the closure means is a rigid component.

Another inconvenience encountered in the specific application of the valve device for filling cylinders is represented by the fact that the membrane valve thus conceived makes it difficult to produce a vacuum inside the container.

A further drawback encountered is the reduction of the capacity of exiting gas during normal use.

Devices for filling cylinders that employ valves without membranes are known, for example, from the American patent U.S. Pat. No. 4,541,464. In this solution the valve is spherical, normally open. The obstructing sphere is kept in the open position by means of a pin constructed on a spherical member connected to a float by means of a cam driver. During the filling operation the float comes out of the container so that it causes the spherical member to rotate by means of the driving action of the cam. The system is sized in such a way that when the filling position is reached, the rotation of the spherical member causes a loss of contact between the pin and the sphere, which is thrust into the closed position of the valve by the force of gravity, besides a possible return spring.

A principal drawback of such solutions is represented by the fact of its being sensitive to the inclination and the oscillations of the cylinder, also from the moment that the spherical member rotates as an effect of any kind of deviation of the cylinder's axis from the vertical position.

A further problem with this solution is determined by the number of elements that compose it and the use of spherical members that complicate the operations of construction and assembly, making the device particularly sensitive to size tolerances and coupling. For the same reasons, the reliability of this solution in use is limited.

DESCRIPTION OF THE INVENTION

The main purpose of the invention is to make available a valve device for filling containers, in particular containers intended to contain liquefied compressed gas, structurally and functionally conceived so as to avoid all the drawbacks complained of with reference to the prior art cited.

This and other purposes that will appear in what follows are confronted and achieved by the invention by means of a valve device for filling containers accomplished in accordance with the claims that follow.

BRIEF DESCRIPTION OF THE DRAWINGS

The characteristics and advantages of the disclosure will be better shown by the following detailed description of a preferred example of the device, illustrated by way of example but not limitative, with reference to the units drawn in which.

PREFERRED MODE OF ACTUATING THE INVENTION

Figure 1:
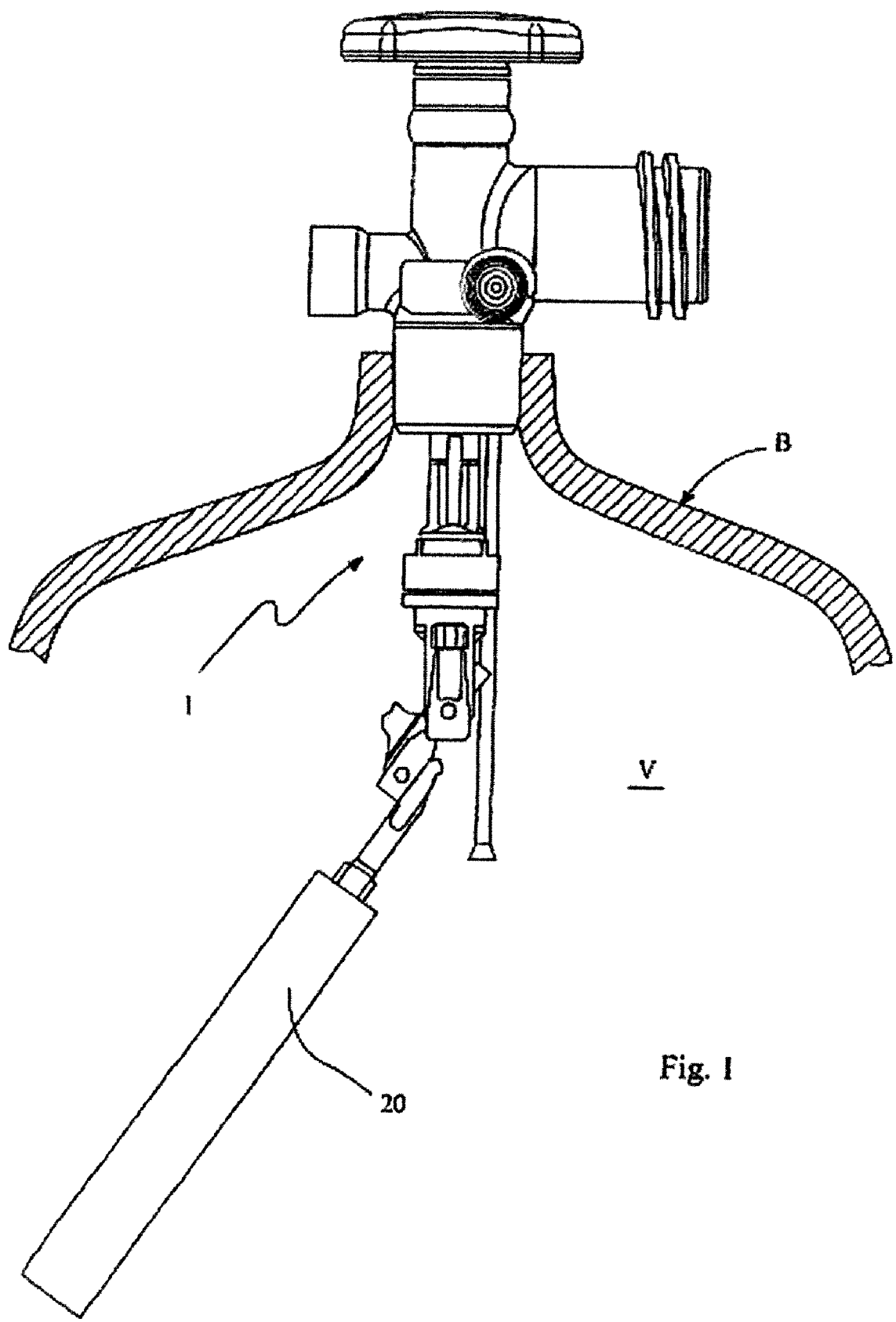
FIG. 1 is a lateral view of a device for preventing overfilling according to the present invention.

In the figures, 1 is a comprehensive indication of a device for preventing overfilling of containers according to the present invention. Device 1 is intended to be applied to a container (cylinder B) for liquefied gas under pressure. Device 1 comprises an upper channel 2 which has a longitudinal axis Y, connected to the pipe union for supplying and filling of cylinder B.

Below channel 2, device 1 comprises a valve device 3a, below which is installed a lower channel 4 with axis X orthogonal to axis Y, connected with an internal volume V of the cylinder, of known cylindrical form with rounded bottoms, intended to collect the liquefied gas stored in cylinder B.

Valve device 3a comprises a valve body 3, interposed between channels 2 and 4, in which is defined a gas duct 5 entering the cylinder, extended mainly along the direction of axis Y. The gas duct 5 is delimited, in the directions transversal to axis Y, by an internal surface 6 of valve body 3.

Valve device 3a comprises a rigid closure means 7 having the shape of a truncated cone, on axis Y with the tapered part turned toward channel 4, axially movable in valve body 3 from and toward a valve seat 8 in order to respectively open and intercept gas duct 5.

Figure 2:
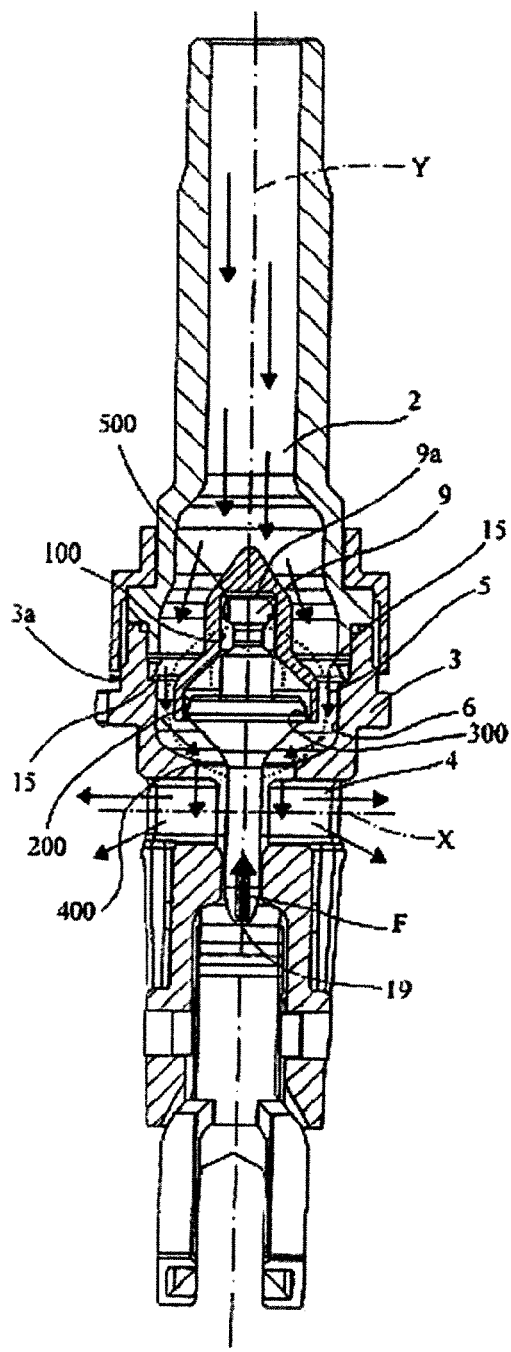
FIG. 2 is a frontal-section view of the device of FIG. 1.

According to a constructible variant (FIGS. 2 and 4), on valve seat 8 is provided an annular rubber gasket, as a seal between valve body 3 and valve seat 8 when gas duct 5 is intercepted. According to another constructible variant, annular gasket 400 is linked to closure means 7.

Closure means 7 comprises a first upper extremity 9, in the form an appendix having a circular base and longitudinally extended along axis Y. Appendix 9 rises from a base surface 7a of closure means 7, turned toward channel 2, and is equipped with a terminal surface 9a.

Valve device 3a furthermore comprises a deflecting cover 10, placed transversally to gas duct 5 and comprising a guide cavity 11 for closure device 7, turned toward channel 4 and equipped with a circular border 11a. At the bottom of cavity 11 there is a first cylindrical guide surface 100, having axis Y, on which is smoothly integrated appendix 9. In cavity 11 is a second cylindrical surface 200, this also with axis Y, interposed between first cylindrical surface 100 and border 11a of cavity 11. On cylindrical surface 200 is smoothly bound the perimetral border 7b of base 7a of closure means 7.

Between border 7b of base 7a of closure means 7 is cylindrical surface 200 and interposed an annular gasket 300, integrated into border 7b, which serves as a seal for preventing the passage of gas from gas duct 5 toward surface 9a and base 7a. According to a constructible variant of the invention, annular gasket 300 can be linked to base 7a and not to border 7b.

Between appendix 9 and cylindrical surface 100 is interposed an annular gasket 500, integrated into appendix 9, which serves as a seal for preventing the passage of gas from gas duct 5 toward surface 9a. According to a constructible variant of the invention, annular ring 500 can be linked to cylindrical surface 100 and not to appendix 9.

According to other constructible variants of the invention, a single gasket is used, in one of the two above described positions for gaskets 300 and 500.

Figure 3:
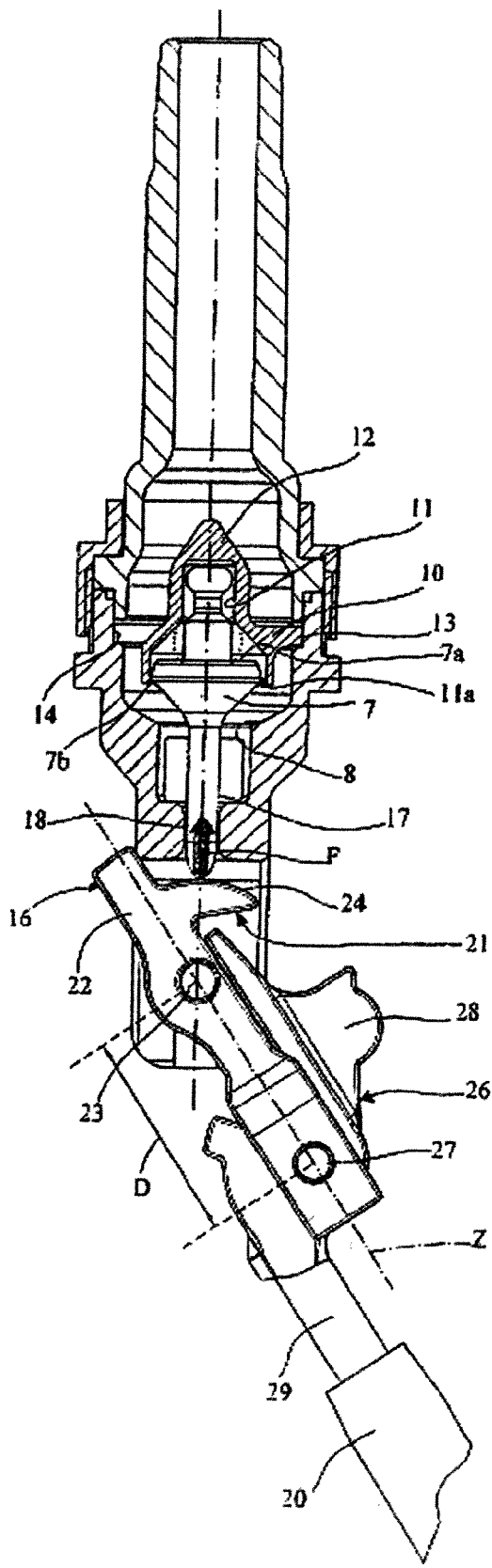
FIG. 3 is a lateral-section view of a constructible variant of the device of FIG. 1.

According to a constructible variant of the invention, between border 7b of base 7a of closure means 7 and cylindrical surface 200 no gasket is interposed, the seal being guaranteed by the sliding contact between border 7b and cylindrical surface 200 (FIG. 3).

Valve seat 8 is located, with respect to gas duct 5, below annular gasket 300.

Deflector lid 10, on the side axially opposite to cavity 11, comprises a central arch 12, capable of being entered by the flow of gas entering the cylinder. Deflector lid 10 is integral to valve body 3, being equipped with a perimetric annular protuberance 13, partially nested in an annular seat 14, located on the inner surface 6 of valve body 3.

Annular protuberance 13 is transverse to axis Y and is provided with a plurality of passages 15, to allow for the flow of entering gas to valve seat 8.

In correspondence to a second extremity, axially opposite with request to appendix 9, closure means 7 comprises a control rod 17, longitudinally extended along axis Y.

Control rod 17 crosses channel 4, above which it is bound in a cylindrical axial guide 18, integral to valve body 3 and working together with guide cavity 11 to axially guide closure means 7. Control rod 17 furthermore comprises an end 19, axially opposite closure means 7.

Device 1 comprises an actuator 16 that can exert a thrusting force F on end 19 of rod 17 in order to urge closure means 7 away from valve seat 8.

Actuator 16 comprises a float 20, extended inside the interior volume V of cylinder B, and a cam mechanism 21 to exert the thrust F, in a rising phase of float 20. Thrust F is exerted until it reaches an extreme position preset by float 20, corresponding to a maximum fill level of cylinder B.

Figure 4:
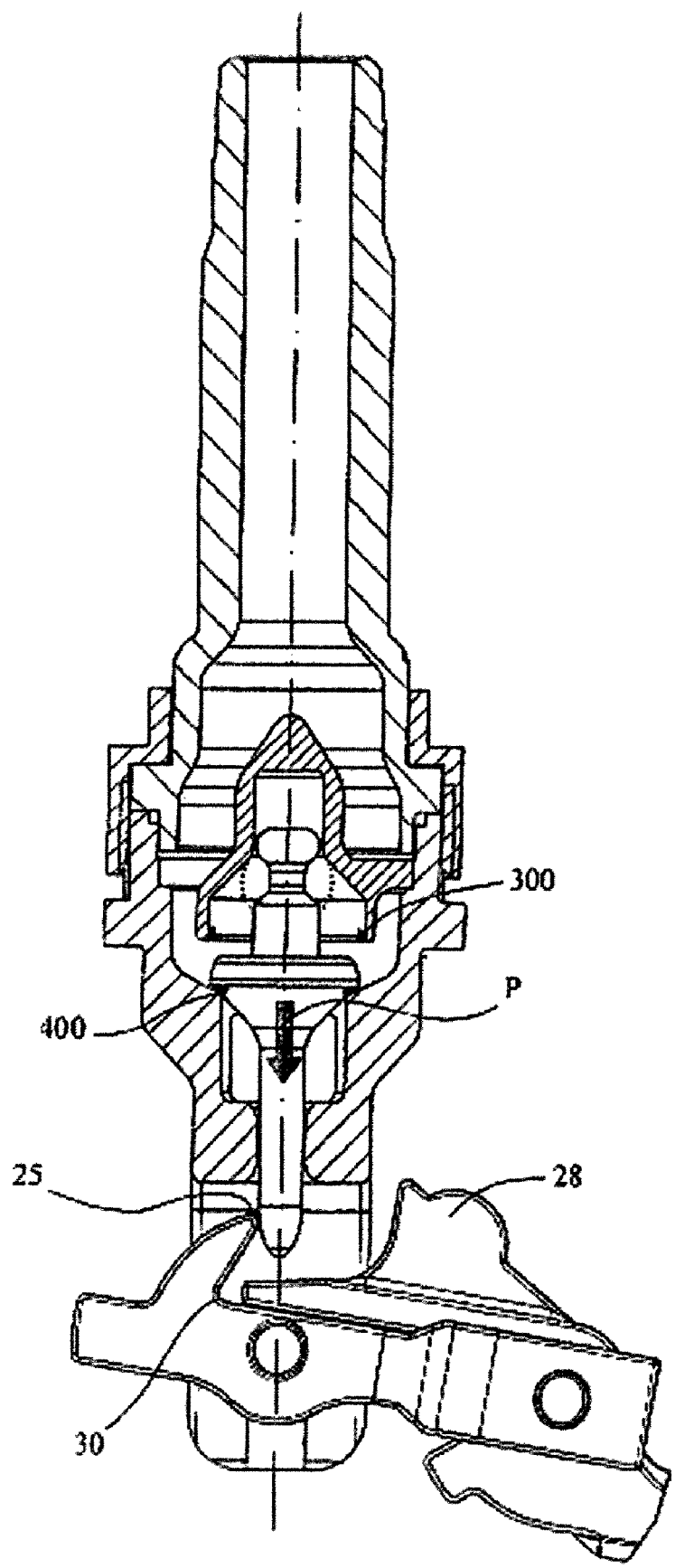
FIG. 4 is a sectional lateral view of the device in FIG. 2, in a different operating state of the device of the present invention.

Mechanism 21 comprises a member 22, linked to valve body 3 by a hinge 23, on which a cam profile 24 is defined. Cam profile 24 is compatible with closure means 7 in order to exert thrust F until it meets end 19 of control rod 17. During the ascending phase of float 20, end 19 of rod 17 slides on cam profile 24 until it reaches an end point 25 (FIG. 4).

Cam profile 24 is an arc of a circle with its center on the axis of hinge 23 so as to hold closure means 7 at a constant distance from valve seat 8. Cam profile 24 is sized in such a way that when float 20 has reached the extreme position of maximum filling, end 19 is placed in correspondence with point 25. In this state, thrust F cannot be exerted, and closure means 7 thus becomes subject only to its own force weight P, which causes closure means 7 to fall toward valve seat 8 so as to intercept gas duct 5.

According to a constructible variant (not shown) of the present invention, the fall of closure means 7 is caused, in addition to weight P, by a return spring.

Actuator 16 furthermore comprises a lever mechanism 26 for exerting thrust F on rod 17 in a first stage of descent of float 20 starting from its extreme point of maximum filling.

Lever mechanism 26 comprises a fulcrum 27, hinged to member 22 at distance D from hinge 23, and a first arm 28 extended from fulcrum 27 toward cam profile 24. First arm 28 [is] compatible with closure means 7 for exerting thrust F, until it meets end 19 of control rod 17 and a second arm 29. Fulcrum 27 is interposed between first arm 28 and a second arm 29, integral to float 20. First arm 28 and cam profile 24 are positioned from the same part with respect to straight line Z, which joins hinge 23 and fulcrum 27.

During the ascending phase of float 20, arms 28 and 29 place themselves in a position aligned with member 22, in such a way that first arm 28 can rest against member 22.

During the descending phase of float 20, end 19 of rod 17 slides on first arm 28 until it reaches an end 30 of first arm 28 in correspondence with an intermediate position of float 20.

In correspondence with the intermediate position of float 20, the point of end 25 of cam profile 24 and end 30 of first arm 28 are adjacent to each other. Besides the intermediate position, in a second part of the ascending phase of float 20, end 19 of rod 17 moves on cam profile 24.

The functioning of lever mechanism 26 described above thus permits the rearming of cam mechanism 21, in such a way that end 19 of rod 17 can move on cam profile 24 when the level of cylinder B is lower than the intermediate one, in particular when cylinder B is empty.

According to other variants of the present invention (not shown), in place of actuator 16, other types of float actuators can be used, provided that they are able to keep closure means 7 open until cylinder B is completely filled The present invention allows us to produce a valve device for filling containers comprising a valve that does not use closure means involving membranes and of a type that is always open.

The reduced number of other valve components, compared to other known solutions, permits the achievement of greater simplicity in the functional geometries and, consequently, fewer rejects in production and greater dependability in usage.

The use of a valve that is always open allows better performance in relation to the implementation of the vacuum in the cylinders.

The invention claimed is:

1. A valve device for filling containers intended to contain liquefied gases, comprising:
   a valve body in which a gas duct is defined at the inlet of said container, said gas duct extending predominantly in an axial direction,
   a closure member axially movable in said valve body away from and towards a valve seat in order to open and to shut off said gas duct, and comprising a first upper extremity in the form of an appendix protruding from a base surface of the closure member and wherein a seal is provided at the base surface for preventing the passage of gas from the gas duct, a float-type actuator capable of exerting a thrust on a second end of said closure member, a deflector cover disposed transversely to the gas duct and integral with said valve body, and including a guide cavity, wherein the guide cavity comprises a first and a second guide surface, the appendix and an edge of the base surface being slidably engaged with the first and the second guide surface, respectively.

2. A valve device according to claim 1, wherein the seal is interposed between said deflector cover and said closure member in order to prevent the passage of the gas from said gas duct towards said first end, said valve seat being located, with respect to said gas duct, downstream of said seal.

3. A valve device according to claim 2, wherein a plurality of passages for said gas duct are provided between said deflector cover and said valve body.

4. A valve device according to claim 1, wherein said closure member is of the piston type.

5. A valve device according to claim 1, wherein said second end is engaged in an axial guide, integral with said valve body and co-operating with said guide cavity in order to guide said closure member.

6. A valve device according to claim 1, wherein said float-type actuator comprises a lever mechanism capable of exerting a thrust on said second end of said closure member.

7. A valve device according to claim 6, wherein said thrust is exerted in at least a first part of a descending phase of said float, starting from a limit position.

8. A valve device according to claim 1, wherein said seal comprises at least one annular gasket.

9. A valve device according to claim 8, wherein said at least one annular gasket is disposed along the edge of said guide cavity.

10. A valve device according to claim 1, wherein the seal comprises a gasket linked to the base surface of the closure member.

11. A valve device according to claim 1, wherein the deflector cover comprises a central arch located on the side axially opposite to the cavity.

12. A valve device according to claim 1, wherein the actuator comprises a cam mechanism capable of exerting a thrust on the second end of the closure member and linked to the valve body by a hinge and further comprising a cam profile formed by an arc of circle with its center on the axis of the hinge and extending laterally to a straight line defined by a member of the mechanism.

13. A valve device according to claim 12, wherein the thrust is exerted in an ascending phase of said float until a preimposed limit position, corresponding to a maximum filling level, is reached.

14. A valve device according to claim 1, comprising a lower channel connecting an internal volume of the container and wherein the lower channel is oriented orthogonal to a longitudinal axis along which the gas duct predominantly extends.

* * * * *